United States Patent [19]
Snyder et al.

[11] Patent Number: 5,707,916
[45] Date of Patent: Jan. 13, 1998

[54] CARBON FIBRILS

[75] Inventors: Carl Snyder, Silver Lake, Ohio; W. Harry Mandeville, Lynnfield, Mass.; Howard G. Tennent, Kennett Square, Pa.; Larry K. Truesdale, North Andover; James J. Barber, Arlington, both of Mass.

[73] Assignee: Hyperion Catalysis International, Inc., Cambridge, Mass.

[21] Appl. No.: 694,244

[22] Filed: May 1, 1991

Related U.S. Application Data

[63] Continuation of Ser. No. 494,894, Mar. 13, 1990, abandoned, which is a continuation of Ser. No. 149,573, Jan. 28, 1988, abandoned, which is a continuation-in-part of Ser. No. 872,215, Jun. 6, 1986, abandoned, which is a continuation-in-part of Ser. No. 678,701, Dec. 6, 1984, Pat. No. 4,663,230, which is a continuation-in-part of Ser. No. 871,676, Jun. 6, 1986, abandoned, which is a continuation-in-part of Ser. No. 871,675, Jun. 6, 1986, abandoned.

[51] Int. Cl.⁶ .............. B01J 21/18; B01J 20/02; B01J 23/00; D01F 9/12
[52] U.S. Cl. .............. 502/180; 502/416; 502/438; 502/192; 502/185; 502/159; 423/447.1; 423/447.2; 423/447.3; 264/29.2; 427/216; 427/221; 427/249; 427/255.1; 428/367; 428/368; 428/376; 428/398; 428/408
[58] Field of Search .............. 502/416, 438, 502/180, 182, 185, 159; 423/447.1, 447.2, 447.3; 264/29.2; 427/216, 221, 249, 255.1; 428/367, 368, 376, 398, 408

[56] References Cited

U.S. PATENT DOCUMENTS

| | | | |
|---|---|---|---|
| 4,518,575 | 5/1985 | Porter et al. | 423/447.3 |
| 4,572,813 | 2/1986 | Arakawa | 423/447.3 |
| 4,583,299 | 4/1986 | Brooks | 502/185 |
| 4,591,334 | 5/1986 | Brooks | 502/185 |
| 4,642,125 | 2/1987 | Burk et al. | 423/657 |
| 4,650,657 | 3/1987 | Brooks | 502/185 |
| 4,663,230 | 5/1987 | Tennent | 428/376 |
| 4,710,483 | 12/1987 | Burk et al. | 502/438 |
| 4,767,737 | 8/1988 | Brooks | 502/438 |
| 5,246,794 | 9/1993 | Blomgren et al. | 429/101 |
| 5,456,897 | 10/1995 | Moy et al. | 423/447.3 |

FOREIGN PATENT DOCUMENTS

| | | | |
|---|---|---|---|
| 117622 | 7/1982 | Japan | 423/447.3 |
| 152299 | 8/1984 | Japan | 423/447.3 |

OTHER PUBLICATIONS

"Filamentous Growth of Carbon Through Beazene Decomposition" by A. Oberlim et al.—Journal of Crystal Growth 32 (1976) No Month Available pp. 335–339—North Holland Publishing Co.

"Formation of Filamentous Carbon from Iron, Cobalt and Chromium Catalyzed Decompositon of Acetylen" by R.J.K Baker et al.—Journal of Catalysts—vol. 30 (1973) No Month Available pp. 86–95 Academic Press Inc.

*Primary Examiner*—Elizabeth D. Wood
*Assistant Examiner*—P. L. Hailey
*Attorney, Agent, or Firm*—Curtis, Morris & Safford, P.C.; Barry Evans; David Rubin

[57] ABSTRACT

A volume of carbon fibrils that includes a multiplicity of fibrils having a morphology consisting of vermicular tubes that are free of a continuous thermal carbon overcoat and have graphite layers that are substantially parallel to the fibril axis and a process for preparing such fibrils.

53 Claims, 2 Drawing Sheets

CARBON FIBRILS

This application is a Continuation of application Ser. No. 07/494,894, filed Mar. 13, 1990, now abandoned, which is a Continuation of application Ser. No. 07/149,573, filed Jan. 28, 1988, now abandoned, which is a Continuation-in-Part of application Ser. No. 06/872,215, filed Jun. 6, 1986, now abandoned, which is a Continuation-in-Part of application Ser. No. 06/678,701, filed Dec. 6, 1984, now U.S. Pat. No. 4,663,230, which is a Continuation-in-Part of application Ser. No. 06/871,676, filed Jun. 6, 1986, now abandoned, which is a Continuation-in-Part of application Ser. No. 06/871,675, filed Jun. 6, 1986, now abandoned.

BACKGROUND OF THE INVENTION

This invention relates to carbon fibrils.

Carbon deposits generally occur in three major forms: amorphous, platelet, and vermicular. Carbon fibrils are vermicular carbon deposits having diameters less than 500 nanometers. These fibrils exist in a variety of forms, including filaments (solid core) and tubes (hollow core), and have been prepared through the catalytic decomposition at metal surfaces of various carbon-containing gases.

Tennent, U.S. Pat. No. 4,663,230, referred to above, describes carbon fibrils that are free of a continuous thermal carbon overcoat and have multiple graphitic outer layers that are substantially parallel to the fibril axis. They are prepared by contacting a carbon-containing gas with an iron, cobalt, or nickel-containing catalyst at a temperature between 850° and 1200° C.

SUMMARY OF THE INVENTION

The invention features, in one aspect, carbon fibrils of the general sort described by Tennent, above. The predominant morphology along the length of an individual carbon fibril is that of vermicular tube free of a continuous thermal carbon (i.e. pyrolytically deposited carbon resulting from thermal cracking of the gas feed used to prepare the fibrils) overcoat and having graphitic layers that are substantially parallel to the fibril axis. The total surface area covered by the thermal overcoat is preferably less than 50%, more preferably 25%, and most preferably less than 5%, and the length of the projection of the graphitic layers on the fibril axis extends along the axis for a distance of at least two (preferably at least five or more) fibril diameters. In a volume of carbon fibrils, preferably a useful amount of the fibrils (as determined by the particular application envisioned) have the above-described morphology. Also preferred are fibril volumes in which at least 10% of the fibrils (preferably at least 50%, more preferably at least 75%) have the above-described morphology.

The fibrils are prepared by contacting a metal catalyst with a carbon-containing gas in a reactor at reaction conditions including temperature sufficient to produce the fibrils with the above-described morphology. Preferred reaction temperatures are 400°–850° C., more preferably 600°–750° C. The fibrils are preferably prepared continuously by bringing the reactor to the reaction temperature, adding metal catalyst particles, and then continuously contacting the catalyst with the carbon-containing gas. Examples of suitable gases include aliphatic hydrocarbons, e.g., ethylene, propylene, propane, and methane; carbon monoxide; aromatic hydrocarbons, e.g., benzene, naphthalene, and toluene; and oxygenated hydrocarbons. The fibrils are preferably grown throughout the volume of the reactor (as opposed to being limited to the reactor walls), with the weight to weight ratio of fibrils to the metal content of the catalyst preferably ranging from 1:1000 to 1000:1.

Preferred catalysts are non-aqueous (i.e., they are prepared using non-aqueous solvents) and contain iron and, preferably, at least one element chosen from Group V (e.g., vanadium), VI (e.g., molybdenum, tungsten, or chromium), VII (e.g., manganese), or the lanthanides (e.g., cerium). Non-aqueous catalysts are preferred because they offer good reproducability and do not require careful control of pH or the catalyst's thermal history. The catalyst, which is preferably in the form of metal particles, may be deposited on a support, e.g., alumina (preferably fumed alumina). These catalysts are useful for the production of carbon fibrils generally, as well as fibrils of the sort described by Tennent. Preferably, the chromium content of the catalyst is less than 8 wt. %.

The carbon fibrils thus prepared have a length-to-diameter ratio of at least 5, and more preferably at least 100. Even more preferred are fibrils whose length-to-diameter ratio is at least 1000. The wall thickness of the fibrils is about 0.1 to 0.4 times the fibril external diameter.

The external diameter of the fibrils preferably is between 3.5 and 75 nm. In terms of fibril diameter distribution, a useful amount of the fibrils (as determined by the particular application envisioned) having the desired morphology have diameters within a predetermined range, preferably 3.5–75 nm. Preferably, at least 10%, more preferably 50%, and, even more preferably, 75% of the fibrils have diameters falling within this range. In applications where high strength fibrils are needed (e.g., where the fibrils are used as reinforcements), the external fibril diameter preferably does not vary by more than 15% over a length of at least 3 fibril diameters (preferably at least 10 diameters, more preferably at least 25).

The invention provides carbon fibrils having a morphology and microstructure (substantially parallel graphitic layers, high length-to-diameter ratio, lack of continuous thermal carbon overcoat) that impart good mechanical properties, e.g., tensile strength. The relatively low temperatures used, coupled with the ability to utilize the entire reactor volume, makes the process economical and efficient.

The fibrils are useful in a variety of applications. For example, they can be used as reinforcements in fiber-reinforced composite structures or hybrid composite structures (i.e. composites containing reinforcements such as continuous fibers in addition to fibrils). The composites may further contain fillers such as carbon black and silica, alone or in combination with each other. Examples of reinforceable matrix materials include inorganic and organic polymers, ceramics (e.g., Portland cement), carbon, and metals (e.g., lead or copper). When the matrix is an organic polymer, it may be a thermoset resin such as epoxy, bismaleimide, polyimide, or polyester resin; a thermoplastic resin; or a reaction injection molded resin. The fibrils can also be used to reinforce continuous fibers. Examples of continuous fibers that can be reinforced or included in hybrid composites are aramid, carbon, and glass fibers, alone or in combination with each other. The continuous fibers can be woven, knit, crimped, or straight.

The composites can exist in many forms, including foams and films, and find application, e.g., as radiation absorbing materials (e.g., radar or visible radiation), adhesives, or as friction materials for clutches or brakes. Particularly preferred are fibril-reinforced composites in which the matrix is an elastomer, e.g., styrene-butadiene rubber, cis-1,4-polybutadiene, or natural rubber; such elastomer-based composites may further contain fillers such as carbon black and silica, alone or in combination. These composites (with or without carbon black or silica fillers) are useful when shaped in the form of a tire; the fibrils allow more oil to be added to the tire.

In addition to reinforcements, the fibrils may be combined with a matrix material to create composites having enhanced thermal and electrical conductivity, and optical properties. Furthermore, the fibrils can be used to increase the surface area of a double layer capacitor plate or electrode. They can also be formed into a mat (e.g., a paper or bonded non-woven fabric) and used as a filter, insulation (e.g., for absorbing heat or sound), reinforcement, or adhered to the surface of carbon black to form "fuzzy" carbon black. Moreover, the fibrils can be used as an adsorbent, e.g., for chromatographic separations.

It has also been discovered that composites reinforced with a volume of carbon fibrils that are vermicular tubes having diameters less than 500 nanometers can be prepared in which the amount of the fibril volume in the composite is significantly less (e.g., less than 50 parts, preferably less than 25 parts, more preferably less than 10 parts) compared to other types of reinforcements that, surprisingly, exhibit good mechanical properties (e.g., modulus and tear strength) despite the lower amount of reinforcement. Preferably, the fibrils are free of a continuous thermal carbon overcoat and have graphitic layers that are substantially parallel to the fibril axis, as described above.

Other features and advantages of the invention will be apparent from the following description of the preferred embodiments thereof, and from the claims.

DESCRIPTION OF THE PREFERRED EMBODIMENTS

We first describe the figures.

Preparation

The preparation of carbon fibrils is described by way of the following examples.

Example 1

Carbon fibrils are prepared by feeding, either by gravity or gas injection (e.g., using an inert gas), metal-containing catalyst particles into a stream of carbon-containing gas in a vertical tube reactor at about 550°–850° C.; the catalyst particles can also be formed in situ through decomposition of a precursor compound, e.g., ferrocene. The reactor includes a quartz tube equipped with an internal quartz wool plug for receiving the catalyst particles and a thermocouple for monitoring the reactor temperature. Inlet ports through which the catalyst, reactant gas, and purge gas, e.g., argon, are added are also provided, as well as an outlet port for venting the reactor.

Suitable carbon-containing gases include saturated hydrocarbons, e.g., methane, ethane, propane, butane, hexane, and cyclohexane; unsaturated hydrocarbons, e.g., ethylene, propylene, benzene, and toluene; oxygenated hydrocarbons, e.g., acetone, methanol, and tetrahydrofuran; and carbon monoxide. The preferred gases are ethylene and propane. Preferably, hydrogen gas is also added. Typically, the ratio of carbon-containing gas to hydrogen gas ranges from 1:20 to 20:1. Preferred catalysts are iron, molybdenum-iron, chromium-iron, cerium-iron, and manganese-iron particles deposited on fumed alumina.

To grow the fibrils, the reactor tube is heated to 550°–850° C. while being purged with, e.g., argon. When the tube is up to temperature (as measured by the thermocouple), the flow of hydrogen and carbon-containing gas is started. For a one inch tube, a hydrogen flow rate of about 100 ml/min. and a carbon-containing gas flow rate of about 200 ml/min. is suitable. The tube is purged with the reactant gases for at least 5 minutes at this rate, after which the catalyst falls onto the quartz wool plug. The reactant gases are then allowed to react with the catalyst throughout the reactor volume (typically for between 0.5 and 1 hour). After the reaction period is over, the flow of reactant gases is stopped and the reactor allowed to cool to room temperature under a carbon-free gas purge, e.g., argon. The fibrils are then harvested from the tube and weighed.

Typically, the fibril yield ratio is at least 30 times the iron content of the catalyst.

The above-described procedure produces a volume of carbon fibrils in which a useful amount (preferably at least 10%, more preferably at least 50%, and, even more preferably, at least 75%) of the fibrils have the following morphological features. They are vermicular graphitic tubes ranging in diameter from 3.5 to 75 nm with lengths ranging from at least 5 to more than 1000 times the diameters. The graphite layers making up the vermicular tubes are substantially parallel to the fibril axis, as described in more detail below. The fibrils are also free of a continuous thermal carbon overcoat.

Figure 1:
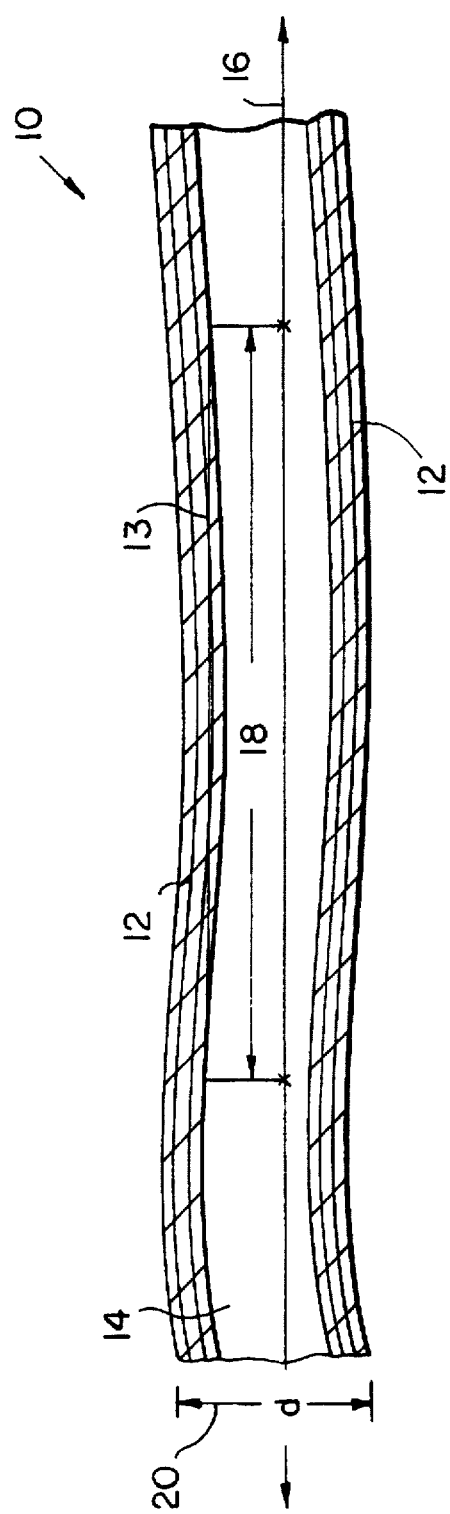
FIG. 1 is a plan view of a portion of a fibril embodying the invention.

FIG. 1 depicts a carbon fibril 10 prepared as described above. Fibril 10 contains a hollow core region 14 surrounded by graphite layers 12 that are substantially parallel to fibril axis 16.

Figure 2:
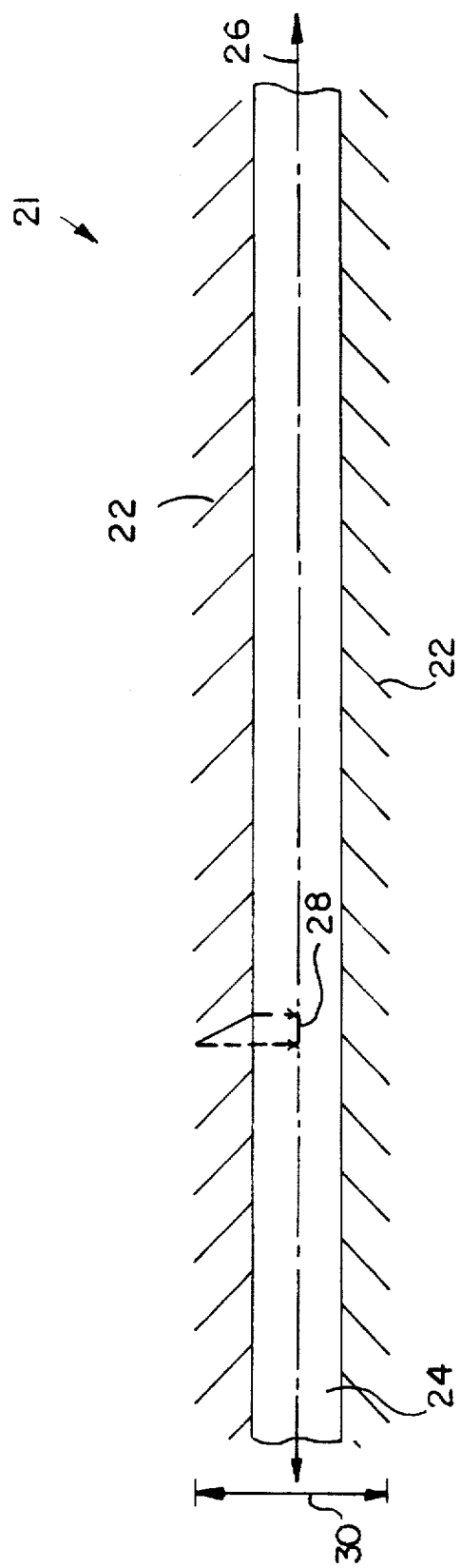
FIG. 2 is a plan view of a portion of a fibril without substantially parallel graphitic layers.

One aspect of substantial parallelism is that the projection 18 of a representative graphite layer 13 extends for a relatively long distance in terms of the external diameter 20 of fibril 10 (e.g., at least two fibril diameters, preferably at least five fibril diameters). This is in contrast to fibril 20 shown in FIG. 2. There, the projection 28 on fibril axis 26 of a graphite layer 22 surrounding hollow core 24 is considerably shorter than fibril diameter 30. This short projection gives rise to the fishbone-type morphology shown in FIG. 2, rather than the substantially parallel morphology shown in FIG. 1.

Fibril 10 shown in FIG. 1 is also free of a continuous thermal carbon overcoat. Such overcoats generally consist of pyrolytically deposited carbon resulting from thermal cracking of the gas feed used to prepare the fibrils. Preferably, the total surface area covered by the thermal overcoat is less than 50% (more preferably less than 25%, and even more preferably less than 5%).

Example 2

Into a 3 L. round bottom flask was added 80.08 g of Degussa fumed alumina and 285 ml of methanol. The mixture was stirred to afford a thick paste before a solution of 78.26 g (0.194 moles) of ferric nitrate nonahydrate and 4.00 g (0.0123 moles) of molybdenum(VI) oxide bis(2,4-pentanedionate) in 300 ml of methanol (Fe to Mo atom ratio of 94:6) was added slowly. The thick paste which had collected on the sides of the flask was washed down with 65 ml of additional methanol and the mixture was stirred for 1 hour before house vacuum (28 in. Hg) was applied while stirring overnight. The purple-tinted solid was placed in a vacuum oven at 100° C. (28 in. Hg) for 29 hr. A total of 110.7 g of catalyst was obtained. The catalyst was ground and passed through an 80 mesh sieve prior to use. Analysis of the catalyst indicated 9.43% iron and 0.99% molybdenum.

A vertical furnace containing a 1 inch quartz tube with an internal quartz wool plug and thermocouple was equilibrated at 650° C. under a down flow of 100 ml/min. hydrogen and 200 ml/min. ethylene. Into the tube (onto the quartz wool plug) was added 0.1044 g of the above-described catalyst. After 30 min., the ethylene flow was stopped and the oven was allowed to cool to near room temperature. A total of 1.2434 g of fibrils was harvested for a yield ratio of 126 times the iron content of the catalyst.

Example 3

A sample of catalyst from example 2 (1.6371 g) was placed in a horizontal furnace under argon and was heated to 300° C. After 30 min. at this temperature, the furnace was cooled and 1.4460 g of catalyst was recovered (12% wt. loss). This should leave 11.1% iron and 1.2% molybdenum in the catalyst.

A vertical tube furnace containing a 1 in. quartz tube with an internal quartz wool plug and thermocouple was equilibrated at 650° C. under a 100 ml/min. down flow of hydrogen and 200 ml/min. flow of ethylene. Into the hot tube was added 0.1029 g of the catalyst described above. After 30 min., the ethylene flow was stopped and the oven was allowed to cool to near room temperature. A total of 1.3705 g of fibrils was isolated for a yield based on theoretical iron content of 120 times the iron content.

Example 4

The vertical tube furnace described in example 2 was equilibrated at 700° C. under the flow of 100 ml/min. hydrogen and 200 ml/min. propane. Onto the quartz wool plug was added 0.1041 g of catalyst from example 2. After 30 min. the fuel gases were stopped and the product was cooled under argon. A total of 3993 g of fibrils was isolated for a yield of 41 times the catalyst iron content.

Example 5

The procedure of example 4 was followed at 650° C. using 0.1004 g of catalyst from example 2. A total of 0.3179 g of fibrils was harvested for a yield of 34 times the iron content of the catalyst.

Example 6

Into a round bottom flask was added 4.25 g of Degussa fumed alumina and 30 ml of methanol. The mixture was mechanically stirred while a solution of 4.33 g (10.7 mmol) of ferric nitrate nonahydrate and 0.51 g (1.56 mmol) of molybdenum(VI)oxide bis(2,4-pentanedionate) in 50 ml of methanol was slowly added. The mixture was stirred for 1 hour before the solvent was removed with the aid of a rotary evaporator. The resulting damp solid was vacuum dried at 105° C., 28 in. Hg for 18 hours. The resulting catalyst was ground and passed through an 80 mesh sieve. A total of 5.10 g of catalyst was obtained. Analysis of the catalyst indicated 9.04% iron and 2.18% molybdenum to be present.

Fibrils were prepared following the procedure of example 2 at 650° C. using 0.0936 g of the above catalyst. A total of 0.9487 g of fibrils was isolated for a yield of 126 times the iron content by weight.

Example 7

Into a round bottom flask was added 3.80 g of Degussa fumed alumina and 30 ml of methanol. The mixture was mechanically stirred while a solution of 4.33 g (10.7 mmol) of ferric nitrate nonahydrate and 2.04 g (6.25 mmol) of molybdenum(VI)oxide bis(2,4-pentanedionate) in 100 ml of solvent was removed at 105° C. and 28 in. Hg for 17 hrs. The dried catalyst was sieved (80 mesh) to afford 6.10 g of powder. Analysis of the catalyst indicated 8.61% iron and 8.13% molybdenum by weight.

Fibrils were prepared following the procedure of example 2 at 650° C. using 0.1000 g of the above catalyst. A total of 0.8816 g of fibrils was isolated for a yield of 102 times the iron content by weight.

Example 8

The procedure of example 7 was followed at 700° C. using methane and 0.1016 g of catalyst. A total of 0.0717 g of fibrils were isolated for a yield of 8.2 times the iron content of the catalyst.

Example 9

Into a 500 ml round bottom flask was placed 4.37 g of Degussa fumed alumina and 28 ml of methanol. To the stirred mixture was added a solution of 4.33 g (10.7 mmol) of ferric nitrate nonahydrate and 0.46 g (1.32 mmol) of chromium acetylacetonate in 75 ml of methanol. The mixture was stirred for 1 hr before it was dried for 18 hr at 105° C. and 28 in. Hg. The catalyst was ground and sieved (80 mesh) to afford 5.57 g of powder. The theoretical metal content by weight was 11.9% iron and 1.4% chromium.

Fibrils were prepared following the procedure of example 2 at 650° C. using 0.0976 g of the above catalyst. A total of 0.9487 g of fibrils was isolated for a yield of 82 times the theoretical iron content.

Example 10

Into a 500 ml round bottom flask was placed 4.40 g of Degussa fumed alumina and 35 ml of methanol. To the thick paste was added 4.32 g (10.7 mmol) of ferric nitrate nonahydrate in 35 ml of methanol. The mixture was stirred for 45 min. before the solid was dried at 95° C. and 28 in. Hg for 18 hr. The catalyst was ground and sieved (80 mesh).

Fibrils were prepared following the procedure of example 2 at 650° C. using 0.0930 g of the above catalyst. A total of 0.4890 g of fibrils was isolated for a yield of 46 times the theoretical iron content.

Example 11

Into a round bottom flask was placed 4.33 g of Degussa fumed alumina in 30 ml of methanol. To the stirred paste was added a solution of 4.33 g (10.7 mmol) of ferric nitrate nonahydrate and 0.42 g (1.19 mmol) of ferric acetylacetonate in 50 ml of methanol. The mixture was stirred for 75 min. before drying at 105° and 28 in. Hg for 17 hrs. The solid was ground and sieved (80 mesh) to afford 5.87 g of catalyst. Analysis showed 13.79% iron present in the catalyst.

Fibrils were prepared following the procedure of example 2 at 650° C. using 0.0939 g of the above catalyst to afford 0.3962 g of fibrils. This corresponds to 31 times the theoretical iron content of the catalyst.

Example 12

Into a round bottom flask was added 4.33 g of Degussa fumed alumina in 20 ml of water followed by a solution of 4.33 g (10.7 mmol) of ferric nitrate nonahydrate and 0.17 g (0.138 mmol) of ammonium molybdate in 40 ml of water.

The mixture was mechanically stirred for 1 hour. The water was removed at reduced pressure at 40° C. overnight. Final drying was accomplished at 140° C. and 26 mmHg for 21 hours to afford 5.57 g of solid. Analysis of the catalyst showed 9.87% iron and 1.45% molybdenum to be present.

Fibrils were prepared following the procedure of example 2 at 650° C. using 0.0794 g of catalyst to afford 0.8656 g of fibrils. This corresponds to 111 times the iron content of the catalyst.

Example 13

Into a round bottom flask, containing 4.33 g of Degussa fumed alumina and 30 ml of methanol, was added a solution of 4.33 g (10.7 mmol) of ferric nitrate nonahydrate and 0.16 g (0.368 mmol) of ceric nitrate in 50 ml of methanol. An additional 20 ml of methanol was used to wash all the salts into the flask. The mixture was stirred for one hour before the solvent was removed at reduced pressure. The solid was dried at 130° C. and 27 mmHg for four days to afford 5.32 g of catalyst. Analysis of the solid indicated 9.40% iron and 0.89% cerium to be present.

Fibrils were prepared followng the procedure of example 2 at 650° C. using 0.0914 g of catalyst to afford 0.7552 g of fibrils. This corresponds to 88 times the iron content of the catalyst.

Example 14

Into a round bottom flask was added 4.33 g of Degussa fumed alumina and 30 ml of methanol. Onto the alumina was poured a solution of 4.33 g (10.7 mmol) of ferric nitrate and 0.31 g (1.22 mmol) of manganese(II) acetylacetonate in 50 ml of methanol. The solvent was removed at reduced pressure (27 mmHg) and the damp solid was vacuum dried at 140° C. to afford 5.18 g of solid. Analysis of the catalyst indicated 9.97% iron and 1.18% manganese.

Fibrils were prepared followng the procedure of example 2 at 650° C. using 0.070 g of catalyst to afford 0.4948 g of fibrils. This corresponds to 66 times the iron content of the catalyst.

Example 15

Into a round bottom flask was added 4.33 g of Degussa fumed alumina and 30 ml of methanol. Onto the alumina was poured a solution of 4.33 g (10.7 mmol) of ferric nitrate and 0.43 g (1.22 mmol) of manganese(III) acetylacetonate in 50 ml of methanol. The solvent was removed at reduced pressure and the damp solid was vacuum dried at 140° C. to afford 5.27 g of solid. Analysis of the catalyst indicated 10.00% iron and 1.18% manganese.

Fibrils were prepared following the procedure of example 2 at 650° C. using 0.0723 g of catalyst to afford 0.7891 g of fibrils. This corresponds to 110 times the iron content of the catalyst.

Example 16

Degussa fumed alumina (400 g) and deionized water (8.0 L) were added to a 22 L flask equipped with a stirrer, pH meter and probe, and two 2 L addition funnels. One funnel contained an aqueous solution of ferric nitrate nonahydrate (511 g dissolved in 5654 ml of water) and the other an aqueous solution of sodium bicarbonate (480 g dissolved in 5700 ml of water).

The pH of the alumina slurry was first adjusted to 6.0 by adding the sodium bicarbonate solution to raise it or the ferric nitrate solution to lower it. Next, both solutions were added simultaneously over 3–4 hours with good agitation while maintaining the pH at 6.0. When the addition was complete, stirring was continued for an additional ½ hour, after which the slurry was filtered on a 32 cm Buchner funnel. The filter cake was then washed with deionized water and returned to the 22 L flask. Next, additional deionized water was added and the slurry stirred for another ½ hour. The batch was then filtered, washed with deionized water, and vacuum-dried at 100° C. to constant weight (475 g). Following drying, the final catalyst was prepared by grinding and sieving the product to −80 mesh.

Example 17

A four-inch quartz tube, closed on the bottom, was placed in a 4 inch diameter×24 inch long furnace. The tube was purged with argon while being heated to 620° C. When the tube was hot, the gas feed was switched to a mixture of hydrogen (1.0 l/min) and ethylene (5.6 l/min) via a dip tube to the bottom of the 4 inch tube. After 5 min of purging, the catalyst addition was begun.

A total of 41.13 g of catalyst, prepared as described in example 16, was added to the catalyst reservoir. The catalyst was added to the hot reactor in small portions (0.2 g) over a period of approximately six hours. The reaction was allowed to run for an additional one hour and then cooled to room temperature under argon. The fibrils were removed from the tube and weighed. This batch gave 430 g total yield.

Example 18

The tube and furnace described in example 17 were heated to 650° under an argon purge. When the tube was hot the gas feed was switched to hydrogen and ethylene as described in example 17.

A total of 20.4 g of catalyst (Fe-Mo) prepared as described in example 2 was added in a manner similar to that described in example 17. This batch gave a total yield of 255 g.

Example 19

The continuous production of carbon fibrils is carried out as follows.

A stream consisting of recycle and make-up CO is fed into a brick-lined flow tower reactor (diameter=0.30 meters, height=20 meters) along with the catalyst prepared as described in example 2. The mixed recycle and make-up CO stream enters the tower at the top and flows down through ceramic strip heaters which bring its temperature to 1100° C. The catalyst is fed by a star feeder into the CO stream.

Gas flow through the reaction zone is 0.16 m/sec and the zone is approximately 10 meters long. The reaction may be terminated by the injection of cold (100° C.) gas. Product fibrils are collected on a porous ceramic filter and the effluent gas is recompressed to about 1.3 atmospheres. A small purge is taken from the effluent gas to balance unknown impurities formed in the reactor and contained in the feed CO. The stream passes through a KOH bed (0.5 m in diameter×2 m long) before the make-up CO is added. The stream then is divided, with 9 g/second being diverted through a heat exchanger and the remaining 3 g/second returning to the reaction tower.

After 3 hours, the system is shut down and cooled and the ceramic filter is removed. The carbon fibrils are obtained matted to the filter.

Example 20

The catalyst was prepared according to example 2, ground, and passed through a 500 mesh sieve. Analysis indicated 9.84% iron and 0.95% molybdenum, present in the catalyst.

A one inch diameter quartz tube containing a coarse quartz frit was positioned vertically in a furnace. The reactor was heated to a temperature of 630° C., as measured by a thermocouple positioned just below the quartz frit. Above the frit, the temperature was 20°-40° higher, depending on the distance from the frit. The feed gas flow composition was 1390 ml/min of ethylene and 695 ml/min of hydrogen. Catalyst was injected into the reactor above the frit and allowed to react for 5 minutes. The product was purged from the reactor by quadrupling the gas flow for 10 seconds. Isolation of the product was accomplished via a cyclone. After a short re-equilibration time, the above procedure was repeated. After 23 cycles a yield of 22 times the iron content of the charged catalyst was obtained.

Other embodiments are within the following claims:

We claim:

1. A process for preparing a volume of carbon fibrils comprising contacting a metal catalyst with a carbon-containing gas, in a reactor, at reaction conditions including a temperature sufficient to produce said volume, wherein said volume comprises a multiplicity of fibrils having a morphology consisting of vermicular tubes substantially free of pyrolytically deposited carbon, with a substantially constant diameter and having graphitic layers, wherein the length of the projection of said graphitic layers extends at least two fibril diameters along the fibril axis and said metal catalyst comprises iron and at least one element selected from the group consisting of V, Nb, Ta, Cr, Mo, W, Mn, Tc, Re, lanthanide, or mixtures thereof.

2. The process of claim 1 wherein at least 10% of said fibrils have said morphology.

3. The process of claim 1 wherein at least 50% of said fibrils have said morphology.

4. The process of claim 1 wherein at least 75% of said fibrils have said morphology.

5. The process of claim 1 wherein a useful amount of said fibrils have said morphology.

6. The process of claims 2, 4, or 5 wherein said morphology includes a diameter range between 3.5 and 75 nm.

7. The process of claim 1 wherein said catalyst comprises iron.

8. The process of claim 1 wherein said catalyst further comprises at least one Group VI element.

9. The process of claim 8 wherein said Group VI element is molybdenum.

10. The process of claim 8 wherein said Group VI element is chromium.

11. The process of claim 8 wherein said Group VI element is tungsten.

12. The process of claim 1 wherein said catalyst further comprises at least one Group VII element.

13. The process of claim 12 wherein said Group VII element is manganese.

14. The process of claim 9, 10, 11, 12, or 13 wherein said catalyst is deposited on an alumina support.

15. The process of claim 14 wherein said alumina is fumed alumina.

16. The process of claim 1 wherein said catalyst further comprises at least one lanthanide element.

17. The process of claim 16 wherein said lanthanide element is cerium.

18. The process of claim 16 wherein said Group V element is vanadium.

19. The process of claim 1 wherein said catalyst further comprises at least one Group V element.

20. The process of claim 1 wherein said carbon-containing gas comprises an aliphatic hydrocarbon.

21. The process of claim 20 wherein said aliphatic hydrocarbon is at least one hydrocarbon selected from the group consisting of methane, propane, propylene, ethylene or mixtures thereof.

22. The process of claim 1 wherein said carbon-containing gas comprises an oxygenated hydrocarbon.

23. The process of claim 1 wherein said carbon-containing gas comprises carbon monoxide.

24. The process of claim wherein said carbon-containing gas comprises an aromatic hydrocarbon.

25. The process of claim 24 wherein said aromatic hydrocarbon comprises toluene, naphthalene, or benzene.

26. The process of claim 1 wherein said temperature is between 400° and 850° C.

27. The process of claim 1 wherein said temperature is between 600° and 750° C.

28. The process of claim 1 further comprising producing at least 1000 weights of said fibrils per 1 weight of the metal content of said catalyst.

29. The process of claim 1 further comprising producing at least 100 weights of said fibrils per 1 weight of the metal content of said catalyst.

30. The process of claim 1 further comprising producing at least 10 weights of said fibrils per 1 weight of the metal content of said catalyst.

31. The process of claim 1 further comprising producing at least 1 weight of said fibrils per 1 weight of the metal content of said catalyst.

32. The process of claim 1 further comprising producing at least 1 weight of said fibrils per 10 weights of the metal content of said catalyst.

33. The process of claim 1 further comprising producing at least 1 weight of said fibrils per 100 weights of the metal content of said catalyst.

34. The process of claim 1 further comprising producing at least 1 weight of said fibrils per 1000 weights of the metal content of said catalyst.

35. The process of claim 1 further comprising growing said fibrils throughout the volume of said reactor.

36. The process of claim 1 wherein said fibril volume is continuously produced by continuously contacting said carbon-containing gas with said catalyst in said reactor.

37. The process of claim 1, wherein said reactor is heated to said preselected temperature and said catalyst is added to said heated reactor.

38. The process of claim 1 wherein the surface area of said fibrils having said morphology covered by said pyrolytically deposited carbon is less than 50% of the fibrils.

39. The process of claim 1 wherein the surface area of said fibrils having said morphology covered by said pyrolytically deposited carbon is less than 25% of the fibrils.

40. The process of claim 1 wherein the surface area of said fibrils having said morphology covered by said pyrolytically deposited carbon is less than 5% of the fibrils.

41. The process of claim 1 wherein said catalyst is iron or iron-chromium particles deposited on fumed alumina, said carbon-containing gas is ethylene, and said temperature is between 600° and 750° C.

42. A volume of carbon fibrils prepared according to the process of claim 1.

43. The process of claim 1, wherein the length of the projection of said graphitic layers extends at least five fibril diameters along the fibril axis.

44. A process for preparing carbon fibrils comprising contacting a catalyst with a carbon-containing gas in a reactor under reaction conditions sufficient to produce said fibrils, wherein said catalyst comprises iron, and at least one of molybdenum, cerium, or manganese, and wherein said catalyst has less than 8 wt. % chromium.

45. The process of claims 44 wherein said catalyst is deposited on an alumina support.

46. The process of claim 45 wherein said alumina is fumed.

47. A process for preparing carbon fibrils comprising contacting a particular catalyst with a carbon-containing gas in a reactor under reaction conditions sufficient to product said fibrils, wherein said catalyst comprises iron and at least one of molybdenum, cerium, or manganese.

48. Carbon fibrils prepared according to the process of claims 47, 45, or 46.

49. A process for preparing a volume of carbon fibrils comprising contacting at least one catalyst particle with a carbon-containing gas, in a reactor, at reaction conditions sufficient to produce said volume of fibrils, wherein said catalyst particle comprises at least one catalyst metal deposited on a support particulate.

50. The process as claimed in claim 49, wherein said catalyst metal is selected from the group consisting of V, Nb, Ta, Cr, Mo, W, Mn, Tc, Re, lanthanides or mixtures thereof.

51. The process as claimed in claim 49, wherein said support particulate comprises alumina.

52. The process as claimed in claim 51, wherein said alumina is fumed.

53. The process as claimed in claim 49, wherein the weight to weight ratio of fibrils to metal content of the catalyst is from 1:1000 to 1000:1.

* * * * *